US009780350B2

(12) United States Patent
Menzies et al.

(10) Patent No.: US 9,780,350 B2
(45) Date of Patent: Oct. 3, 2017

(54) MODULAR BATTERY CONNECTOR ASSEMBLY

(71) Applicant: Lear Corporation, Southfield, MI (US)

(72) Inventors: David Menzies, Linden, MI (US); Cecil Lamar Brown, II, Canton, MI (US); Pierre Ocke, Vyskov (CZ)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 14/635,406

(22) Filed: Mar. 2, 2015

(65) Prior Publication Data

US 2015/0255774 A1    Sep. 10, 2015

Related U.S. Application Data

(60) Provisional application No. 61/948,274, filed on Mar. 5, 2014.

(51) Int. Cl.
*H01M 2/20*    (2006.01)
*H01M 2/30*    (2006.01)

(52) U.S. Cl.
CPC .............. *H01M 2/206* (2013.01); *H01M 2/30* (2013.01); *H01M 2/305* (2013.01); *H01M 2220/20* (2013.01)

(58) Field of Classification Search
CPC .. H01M 2/206; H01M 2/305; H01M 2220/20; H01M 2/30; H01M 2/20
See application file for complete search history.

(56) References Cited

U.S. PATENT DOCUMENTS

| | | | |
|---|---|---|---|
| 2011/0151315 A1* | 6/2011 | Masson | H01M 2/1077 429/159 |
| 2013/0164578 A1 | 6/2013 | Sweet et al. | |
| 2014/0158396 A1* | 6/2014 | Nakayama | H01M 2/206 174/110 R |

FOREIGN PATENT DOCUMENTS

TW    201312834 A    3/2013

* cited by examiner

*Primary Examiner* — Mark F Huff
*Assistant Examiner* — Monique Wills
(74) *Attorney, Agent, or Firm* — MacMillan, Sobanski & Todd, LLC (57) ABSTRACT

A battery cell stack connector assembly includes a plurality of busbar modules. Each of the busbar modules has a module frame with a first side with a first connector and a second side with a second connector. Each module frame defines a module axis that extends from the first side to the second side. Each of the busbar modules also includes a busbar attached to the module frame. The plurality of busbar modules are connected to form a connector frame that defines a connector axis that extends from a first assembly side to a second assembly side. The module axes of the plurality of busbar modules are aligned with the connector axis. Also, the first connectors and second connectors are adapted so that each of the plurality of module frames is mated with and attached to respective adjacent module frames.

19 Claims, 8 Drawing Sheets

MODULAR BATTERY CONNECTOR ASSEMBLY

CROSS-REFERENCE TO RELATED APPLICATIONS

This application claims the benefit of U.S. Provisional Application No. 61/948,274, filed Mar. 5, 2014, the disclosure of which is incorporated herein by reference.

BACKGROUND OF THE INVENTION

This invention relates in general to a connector assembly for connecting electric batteries. More specifically, this invention relates to a modular component used to create such a connector assembly.

Batteries are used in a variety of different types of electric equipment. It is advantageous to use standardized battery cells that have known dimensions and supply known amounts of current. Typically, a selected number of battery cells are provided for a piece of electric equipment based on factors including the power requirements of the equipment and the weight, size, and cost of the battery cells. The power requirements of the equipment can vary based on the size and function of the equipment, as well as whether the batteries are provided as a primary power source or as a secondary, or back-up, power source.

One example of electric equipment that includes batteries is an electric vehicle. An electric hybrid or all-electric vehicle typically uses batteries to store power to operate one of more drive motors, as well as other electric systems on the vehicle. The batteries in an electric vehicle are typically installed as stacks of battery cells. The number of stacks and the number of cells in each stack may vary between different vehicles based on the factors such as the power requirements of the vehicle, the operating range, and the cost of the vehicle. Typically, the cells are electrically connected in series to provide a larger voltage. This is normally done by connecting wires or busbars between positive and negative terminals of the cells. The busbars may be provided on a carrier that allows each of the busbars to be positioned correctly relative to the cell terminals prior to connecting the busbars to the cells. A different carrier will need to be provided for a different stack that includes a different number of cells. It would be advantageous to have an improved assembly to electrically connect the cells.

SUMMARY OF THE INVENTION

This invention relates to a battery cell stack connector assembly. The battery cell stack connector assembly includes a plurality of busbar modules. Each of the busbar modules has a module frame with a first side with a first connector and a second side with a second connector. Each module frame defines a module axis that extends from the first side to the second side. Each of the busbar modules also includes a busbar attached to the module frame. The plurality of busbar modules are connected to form a connector frame that defines a connector axis that extends from a first assembly side to a second assembly side. The module axes of the plurality of busbar modules are aligned with the connector axis. Also, the first connectors and second connectors are adapted so that each of the plurality of module frames is mated with and attached to respective adjacent module frames.

This invention also relates to a busbar module. The busbar module includes a module frame having a first side with a first connector and a second side with a second connector. The module frame defines a module axis that extends from the first side to the second side. The busbar module also includes a busbar attached to the module frame and located between the first side and the second side.

This invention further relates to a battery assembly. The battery assembly includes a plurality of battery cells, each of the plurality of battery cells including a positive terminal and a negative terminal. The battery assembly also includes a plurality of busbar modules attached to form a connector assembly. Each busbar module includes a module frame with a first side with a first connector and a second side with a second connector. Each module frame defines a module axis that extends from the first side to the second side. Each busbar modules also includes a busbar attached to the module frame. The first connectors and second connectors are adapted so that each of the plurality of module frames is mated with and attached to respective adjacent module frames. Each of the plurality of busbars is attached to the positive terminal of one of the plurality of battery cells and the negative terminal of another of the battery cells.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
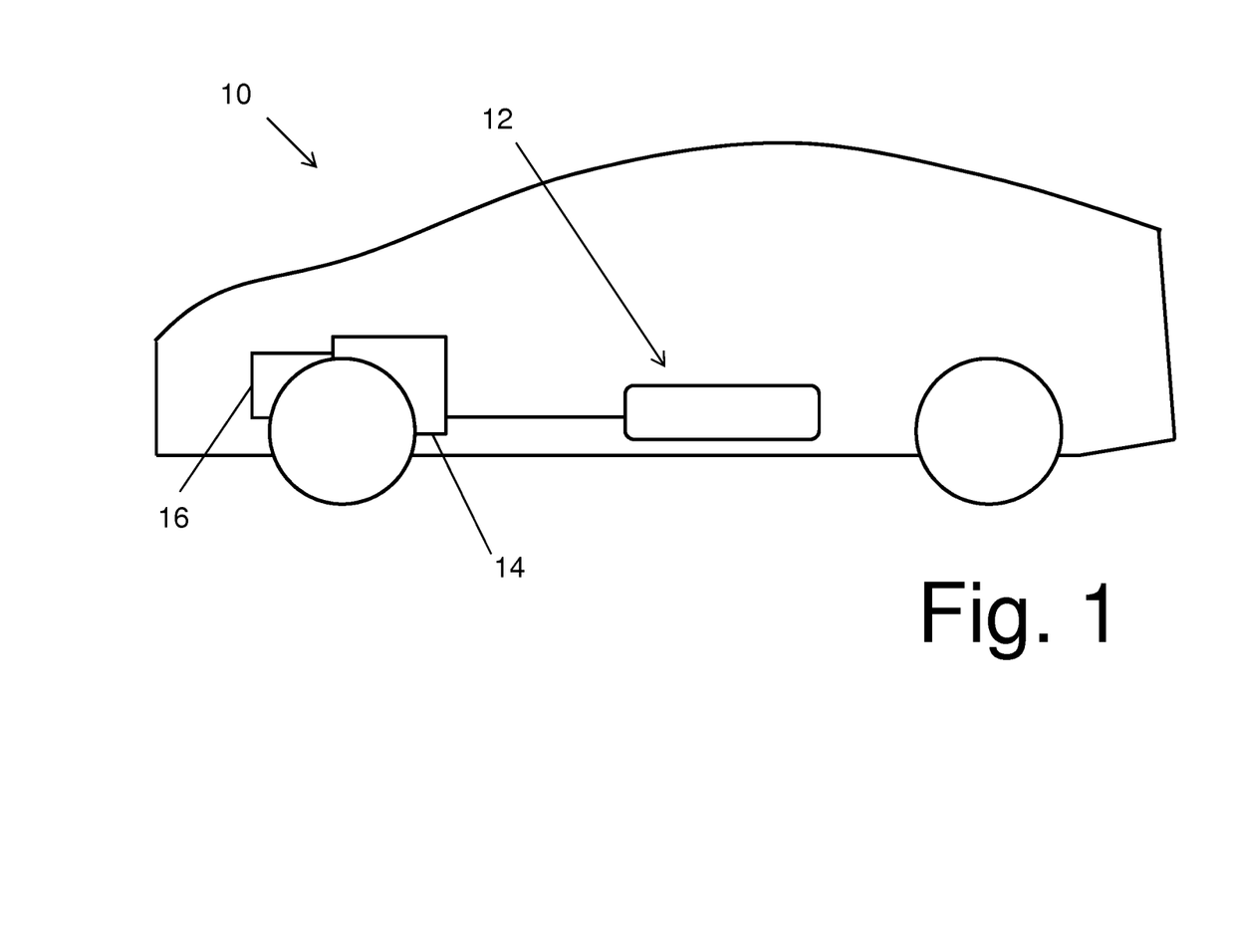
FIG. 1 is a schematic view of an electric vehicle including a battery assembly.

Referring now to the drawings, there is illustrated in FIG. 1 a schematic view of an electric vehicle, indicated generally at 10. The illustrated electric vehicle 10 is a hybrid electric vehicle, but may be any desired type of vehicle. The illustrated electric vehicle 10 includes a battery assembly, indicated generally at 12, which provides power for a drive motor 14 and stores power recovered by brakes 16. The illustrated battery assembly 12 will be described in greater detail below. However, it should be appreciated that the battery assembly 12 may be used in any desired application.

Figure 2:
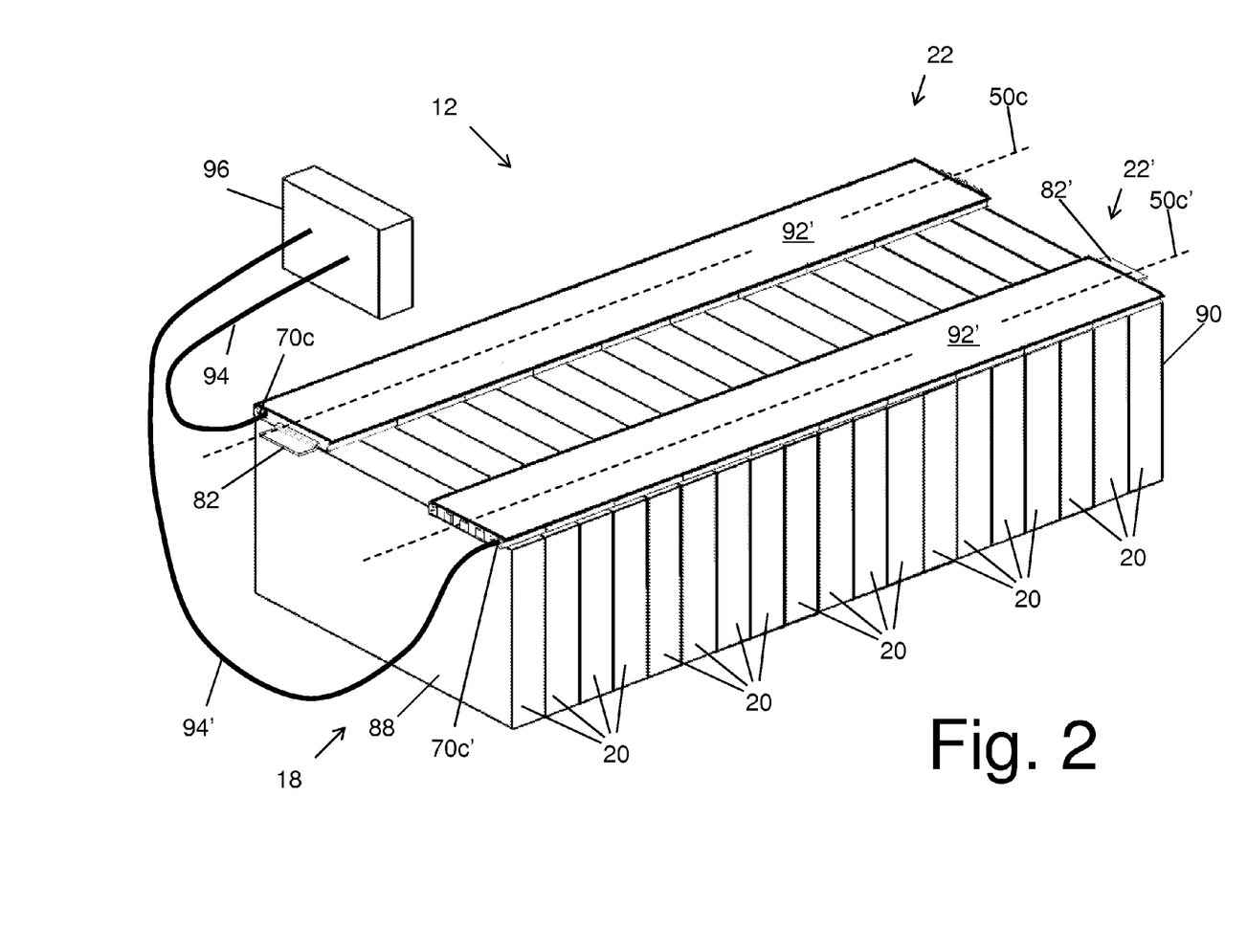
FIG. 2 is a perspective view of the battery assembly from the vehicle shown in FIG. 1.

Referring now to FIG. 2, a perspective view of the battery assembly 12 is shown. The illustrated battery assembly 12 includes a cell stack, indicated at 18. The battery assembly 12 may include more than one cell stack if desired. The cell stack 18 is comprised of a plurality of battery cells 20 that are secured together to form the cell stack 18. Each of the illustrated battery cells 20 is a conventional cartridge assembly that includes a heat sink, a manifold, and a lithium-ion cell (not shown). However, the battery cells 20 may be any desired type of cells. The illustrated cell stack 18 includes nineteen battery cells 20, but the cell stack 18 may include any desired number of battery cells 20. The battery assembly 12 also includes a first connector assembly, indicated at 22, and a second connector assembly, indicated at 22', that are connected to the cell stack 18. The first and second connector assemblies 22 and 22' serve to electrically connect the battery cells 20 of the cell stack 18 in series. The first connector assembly 22 will be described in greater detail below.

Figure 3:
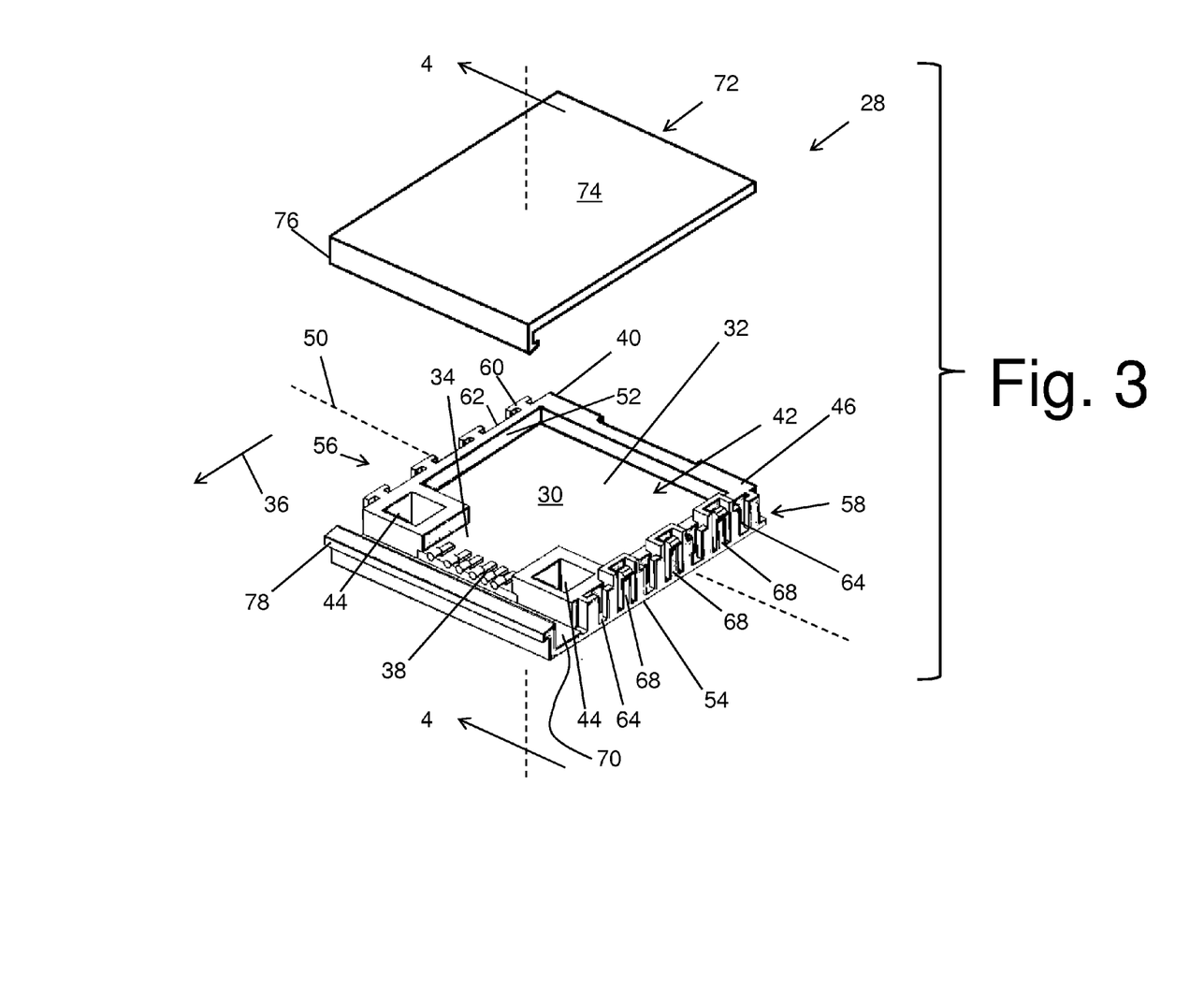
FIG. 3 is an exploded, perspective view of a busbar module.

Referring to FIG. 3, there is shown a perspective view of a first busbar module, indicated generally at 28. The first busbar module 28 includes a busbar 30. The illustrated busbar 30 is generally T-shaped, but may have any desired shape. The illustrated busbar 30 is made of aluminum, but may be made of any desired material or materials. The busbar 30 includes a generally flat terminal attachment portion 32 and a sensor portion 34 that extends from the terminal attachment portion 32 in a sensor direction 36. The illustrated sensor portion 34 is a coplanar extension of the terminal attachment portion 32, but may have any desired configuration or orientation. The illustrated sensor portion 34 is narrower than the illustrated terminal attachment portion 32, which provides the T-shape of the busbar 30. A plurality of sensors 38 are attached to the sensor portion 34 of the busbar 30. The illustrated sensors 38 include voltage and temperature sensors, but may include any desired sensors or signal circuits. The illustrated sensors 38 are attached to the busbar by welding, but may be attached by any desired structure, fastener, or method.

The first busbar module 28 includes a first module frame 40. The illustrated first module frame 40 is a single piece of plastic, but may be made of any desired material. The illustrated first module frame 40 has a generally rectangular shape, but may have any desired shape. The first module frame 40 defines a busbar space, indicated at 42, and the busbar 30 is located in the busbar space 42. The illustrated busbar space 42 is generally T-shaped to accommodate the busbar 30, but the busbar space 42 may have any desired shape. The illustrated first module frame 40 includes a pair of pass-through openings 44. The illustrated pass-through openings 44 are provided between the sides of the first module frame 40 and the sensor portion 34 of the busbar 30, and maintain the generally rectangular shape of the first module frame 40 around the generally T-shape of the busbar space 42. It should be appreciated that the pass-through openings 44 may have a different shape from that illustrated, or may be omitted from the first module frame 40, depending on the shapes of the first module frame 40 and the busbar space 42.

Figure 4:
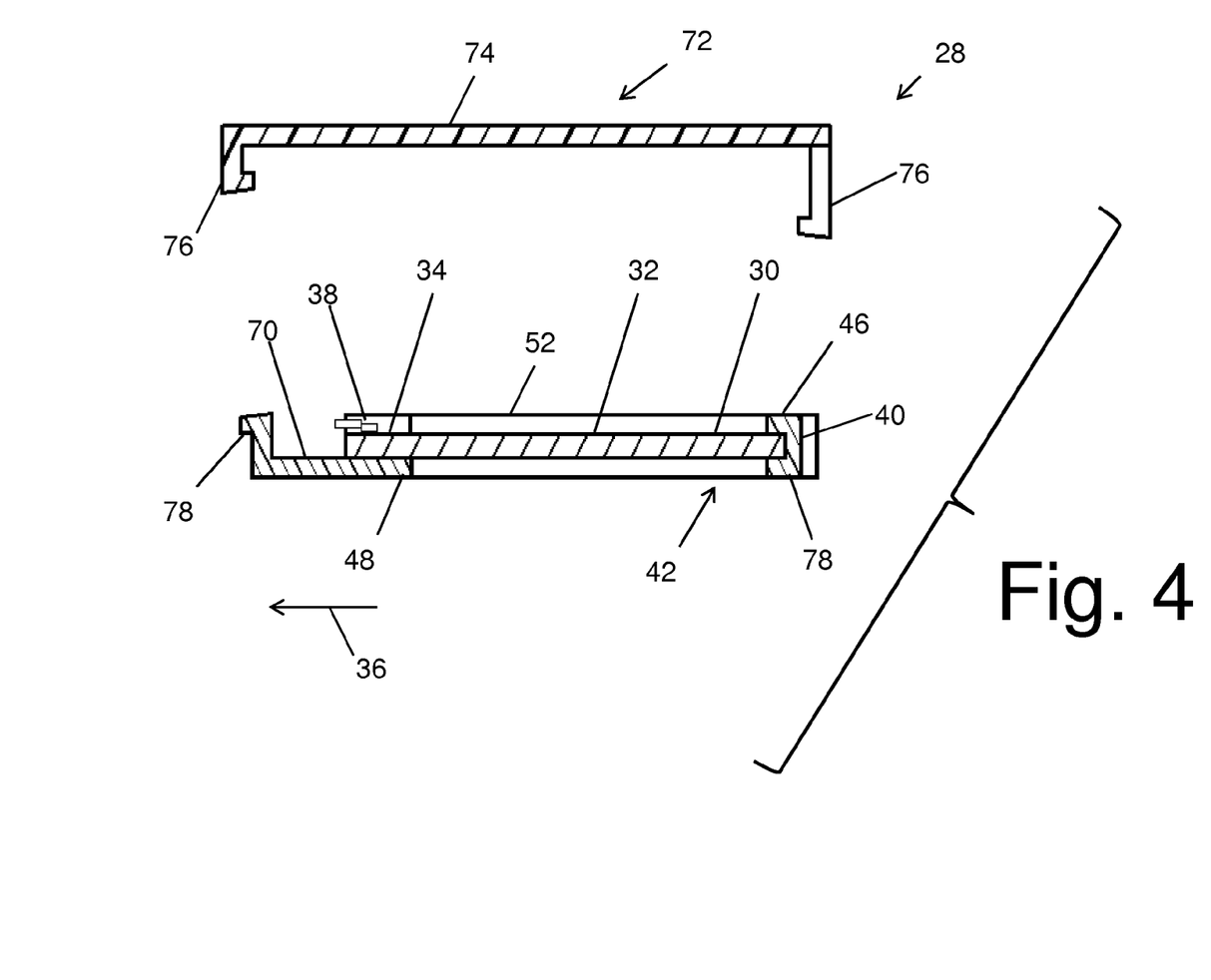
FIG. 4 is a cross-sectional view of the busbar module taken along the line 4-4 of FIG. 3.

Referring to FIG. 4, a cross-sectional view taken along the line 4-4 of FIG. 3 is shown. The illustrated first module frame 40 is overmolded onto the busbar 30 and the busbar 30 is located within the busbar space 42 recessed from a first frame face 46 and a second frame face 48. The overmolding of the first module frame 40 onto the busbar 30 fixes the busbar 30 relative the first module frame 40. However, the busbar 30 may be attached to the first module frame 40 using any desired structure, fastener, or method.

Referring back to FIG. 3, the first busbar module 28 defines a module axis 50. The first module frame 40 includes a first side 52 and a second side 54 that are located on opposite sides of the busbar 30 along the module axis 50. The illustrated first side 52 and second side 54 are both oriented at the same angle relative to the module axis 50, and they are each substantially perpendicular to the module axis 50. However, the first side 52 and the second side 54 may be at any desired angles relative to the module axis 50. The illustrated module axis 50 is perpendicular to the sensor direction 36, but may be any desired direction.

The first side 52 includes a first connector, indicted generally at 56, and the second side 54 includes a second connector, indicated generally at 58. The first connector 56 and the second connector 58 are adapted so that the first busbar module 28 can be mated with and attached to a second, similar module as will be described below. The illustrated first connector 56 includes a plurality of T-shaped extensions 60 and a plurality of arm lock surfaces 62. The illustrated second connector 58 includes a plurality of T-shaped channels 64 and a plurality of resilient lock arms 68. However, it should be appreciated that the first connector 56 and the second connector 58 may be any desired connectors and may have any desired configuration. The illustrated first connector 56 and second connector 58 are integrally molded parts of the first module frame 40, but may be made by any desired method and may be separate components if desired.

The first busbar module 28 also defines a channel, indicated at 70, that extends from the first side 52 to the second side 54. The channel 70 is open on the first frame face 46. The channel 70 is located adjacent to the busbar space 42 in the sensor direction 36 from the busbar space 42. The sensor portion 34 of the busbar 30 is located adjacent to the channel 70. The channel 70 is provided to accommodate wires (not shown for clarity) that are connected to the sensors 38, as will be described below. The illustrated channel 70 extends substantially parallel to the module axis 50. It should be appreciated that the channel 70 may be different from the illustrated channel, if desired.

The first busbar module 28 also includes a cover, indicated at 72. The cover 72 is adapted to connect to the first module frame 40 to protect the busbar 30, the sensors 38, and the channel 70. The illustrated cover 72 is made of plastic, but may be made of any desired material. As best seen in FIG. 3, the cover 72 includes a cover body 74 and two resilient arms 76 extending therefrom. The illustrated resilient arms 76 are molded as part of the cover body 74, but may be made by any desired method and may be separate pieces, if desired. The resilient arms 76 are adapted to snap fit and engage anchor portions 78 of the first module frame 40 in order to retain the cover 72 on the first module frame 40. Alternatively, the cover 72 may be retained on the first module frame 40 using any desired connector.

Figure 5:
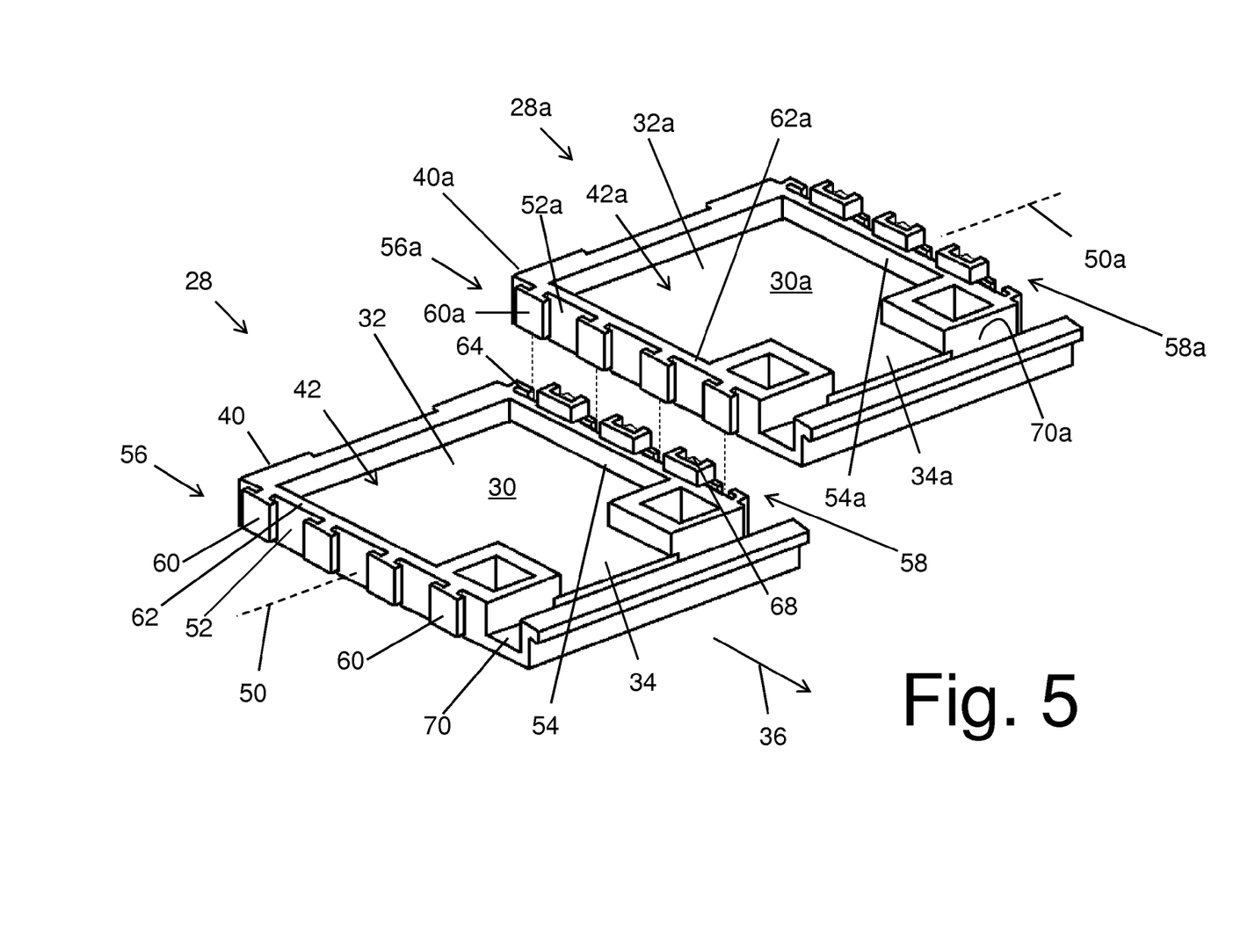
FIG. 5 is a perspective view of a portion of the busbar module shown in FIG. 3, taken from a different angle, with a second busbar module.

Referring now to FIG. 5, the first busbar module 28 and a second busbar module 28a are shown in a perspective view from a different angle so that the first side 52 of the first module frame 40 is visible. The sensors 38 are not shown in FIG. 5 for clarity. The second busbar module 28a is substantially the same as the first busbar module 28 and will not be described separately. Features of the second busbar module 28a that are similar to features of the first busbar module 28 are identified with the same reference number with an "a" suffix.

Figure 6:
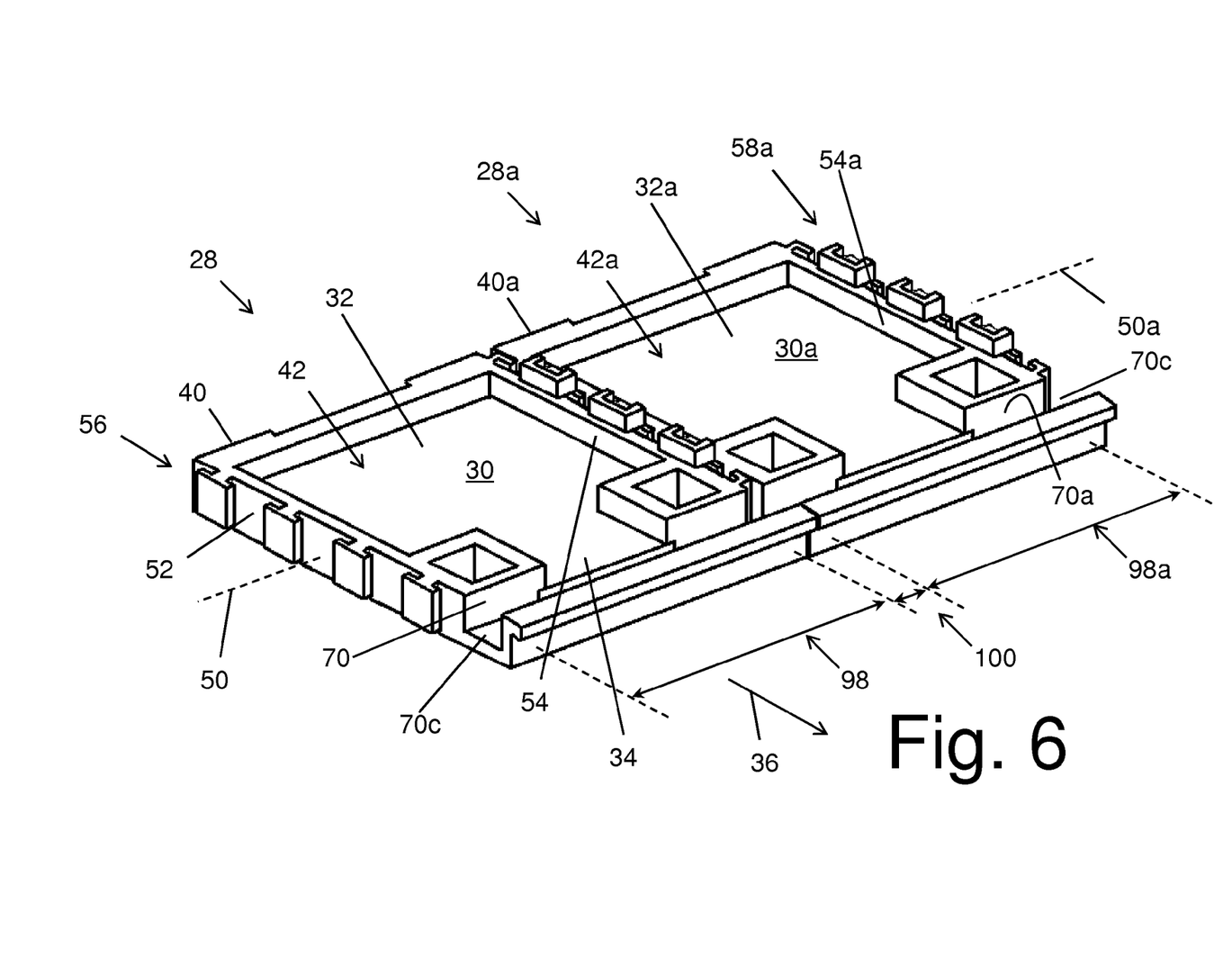
FIG. 6 is a perspective view similar to that shown in FIG. 5, showing the busbar module engaged with the second busbar module.

FIG. 5 illustrates the second module frame 40a positioned to be attached to the module frame 40. The module axis 50 of the module frame 40 is parallel to the module axis 50a of the second module frame 40a. As previously described, the first connector 56a on the second module frame 40a includes a plurality of T-shaped extensions 60a. The T-shaped extensions 60a are inserted into the T-shaped channels 64 on the module frame 40. The resilient lock arms 68 on the module frame 40 are deflected by the second module frame 40a and rebound to engage the lock arms surfaces 62a of the second module frame 40a. The first side 52a of the second module frame 40a is engaged with the second side 54 of the module frame 40, and the second module frame 40a is then attached to the module frame 40, as shown in FIG. 6. As previously described, the illustrated first connector 56a and second connector 58 are adapted so that the module frame 40 can be mated with and attached to the second module frame 40a.

As shown, the channel 70 on the module frame 40 is aligned with the channel 70a on the second module frame 40a. The two channels 70 and 70a provide a continuous connector channel 70c between the first side 52 of the module frame 40 and the second side 54a of the second module frame 40a. It should be appreciated that any desired number of additional, similar, module frames may be connected along the module axis 50.

The busbar 30 and the busbar 30a each have respective busbar lengths, indicated at 98 and 98a. The busbar length 98 is the length of the terminal attachment portion 32 in the direction of the module axis 50. Similarly, the busbar length 98a is the length of the busbar 32a in the direction of the module axis 50a. In the illustrated embodiment, the busbar length 98 is the same as the busbar length 98a. However, the busbar lengths 98 and 98a may have any desired relative size. The terminal attachment portion 32 and the terminal attachment portion 32a are separated by a busbar space, indicated at 100. The busbar space 100 is the length of space between the terminal attachment portion 32 and the terminal attachment portion 32a in the direction of the module axis 50. As will be described below, the size of the busbar lengths 98 and 98a and the busbar space 100 are selected so that the terminal attachment portions 32 and 32a will be properly positioned to be attached to terminals of the cell stack 18.

It should be appreciated that the illustrated first busbar module 28 and second busbar module 28a are identical. However, this is not necessary, and the second busbar module 28a may have features that are different from the first busbar module 28, if desired. The description of the illustrated embodiment included below will reference all similar busbar modules as "first busbar module 28" for clarity.

Figure 7:
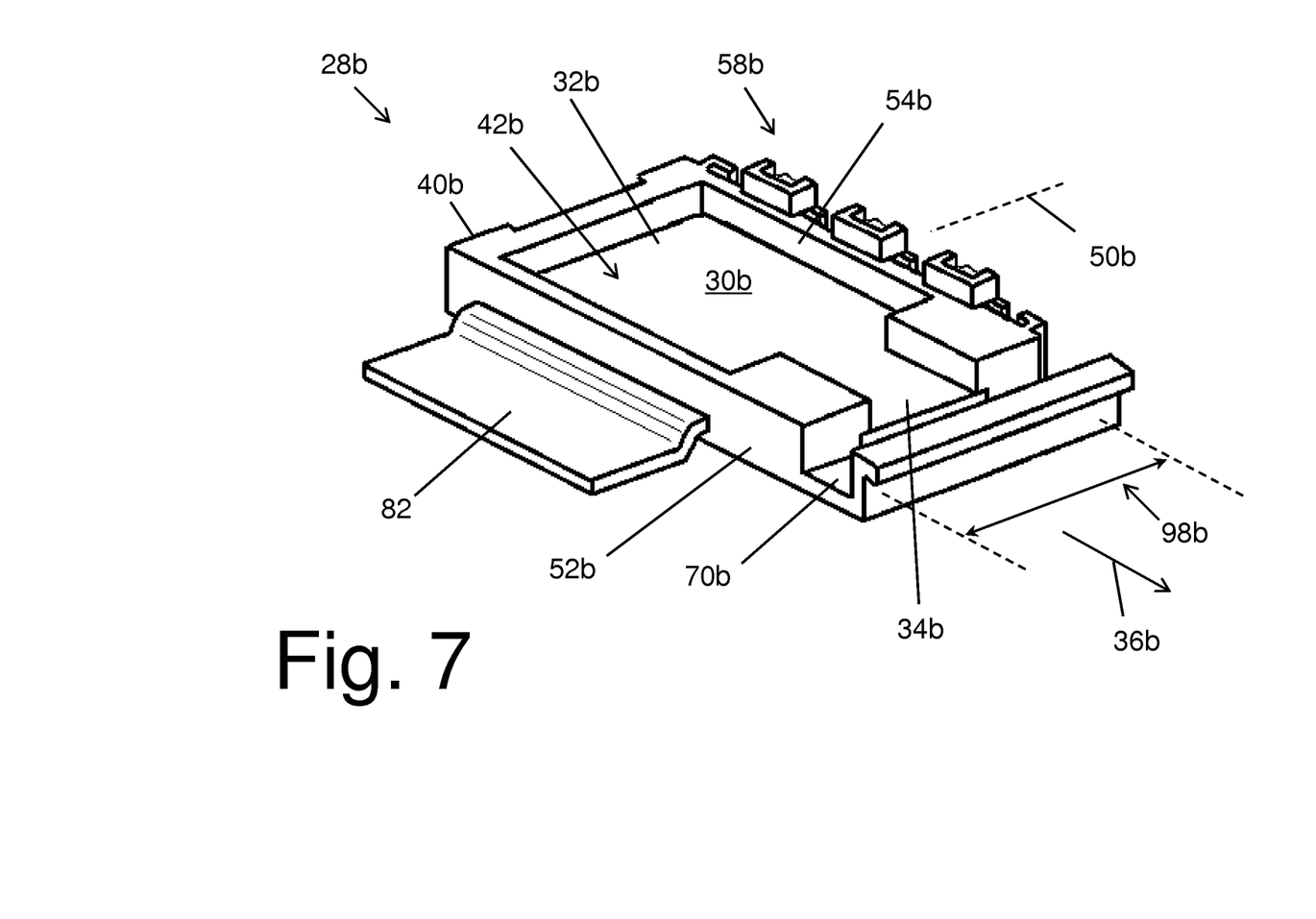
FIG. 7 is a perspective view of an end busbar module.

Referring now to FIG. 7, there is shown a perspective view of an end module 28b. The end module 28b includes many features similar to the first busbar module 28, and similar features a labeled with the same reference number with a "b" suffix. The end module 28b includes an end busbar 30b that is generally T-shaped, but may have any desired shaped. The end busbar 30b includes a terminal attachment portion 32b. The busbar 30b has a busbar lengths 98b that is shorter than the busbar length 98 of the busbar 30. The reason for this, as will be explained below, is that the terminal attachment portion 32b is adapted to be attached to only one terminal while the terminal attachment portion 32 is adapted to be attached to two terminals. The end busbar 30b also includes a connection tab 82 that extends from the terminal attachment portion 32b. The connection tab 82 provides an attachment point for an electric connector (not shown) to attach to the first connector assembly 22. The illustrated connection tab 82 is an integral part of the end busbar 30b, which is made of a piece of stamped aluminum. However, the connection tab 82 may be a separate piece, if desired, and may be made of any desired material. The illustrated connection tab 82 extends from the terminal attachment portion 32b through the first side 52b of the end module frame 40b in the direction of the module axis 50b. However, the connection tab 82 may extend in any desired direction. The end module frame 40b includes a second connector 58b on the second side 54b. This allows the end module frame 40b to be attached to the module frame 40, similar to the manner described above. It should be appreciated that the end module frame 40b may instead include the connection tab 82 extending through the second side 54b and a first connector 56b on the first side 52b.

Figure 8:
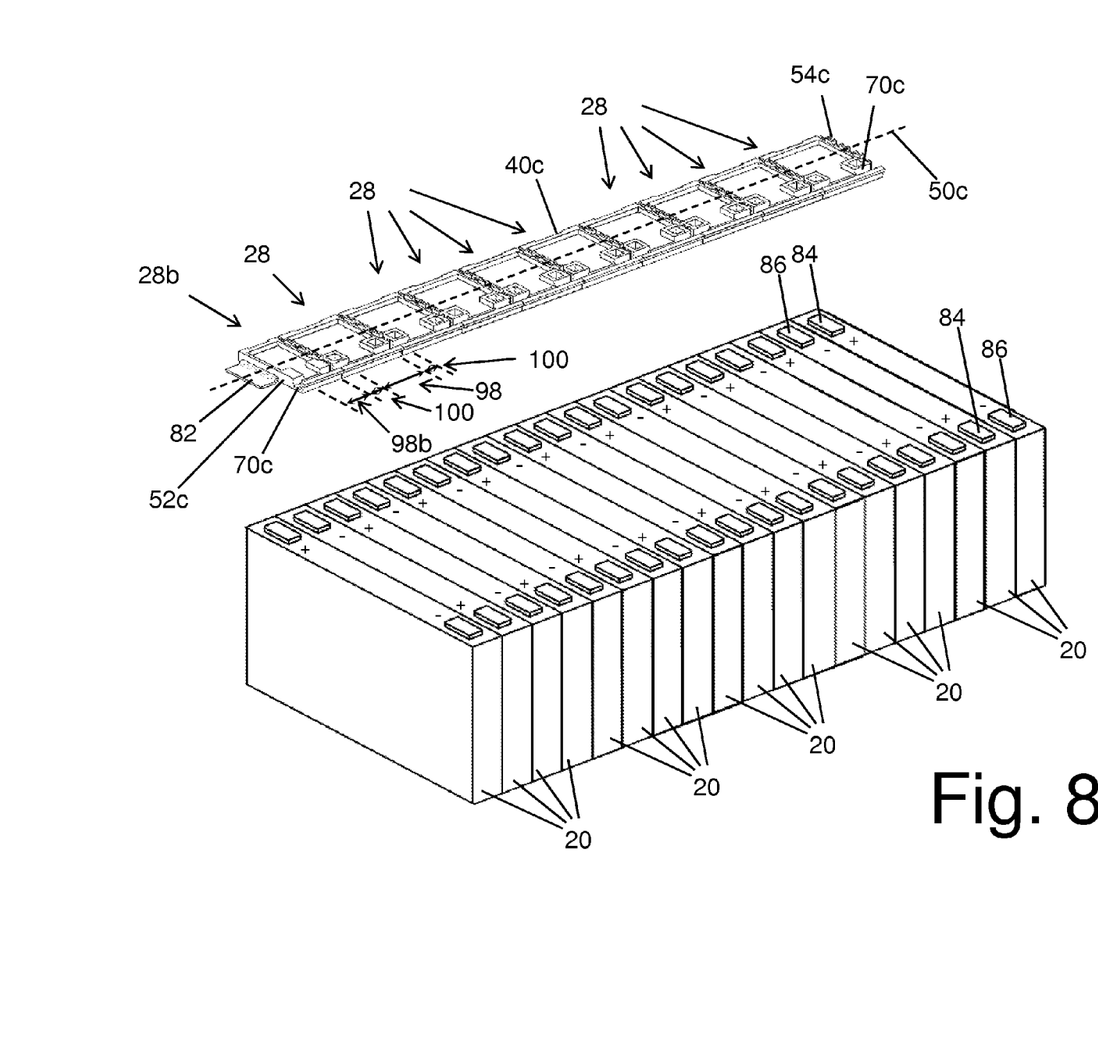
FIG. 8 is a perspective view of a cell stack and a connector assembly.

Referring now to FIG. 8, there is shown an exploded, perspective view of the first connector assembly 22 and the cell stack 18. The illustrated first connector assembly 22 includes nine first busbar modules 28, as well as the end module 28b. However, the first connector assembly 22 may include any desired number of first busbar modules 28 and end modules 28b. The first connector assembly 22 includes a connector frame 40c that is comprised of the module frames 40 and 40b of the individual modules 28 and 28b. The first connector assembly 22 defines a connector axis 50c and each of the module axes 50 and 50b is aligned with the connector axis 50c. Additionally, the connector channel 70c of the first connector assembly 22 includes the channels 70 and 70b of each of the modules 28 and 28b. The connector channel 70c extends from a first assembly side 52c of the frame to a second assembly side 54c of the frame.

Each of the battery cells 20 includes a positive terminal 84 and a negative terminal 86. The cell stack 18 is arranged so that the positive terminal 84 of one battery cell 20 is adjacent to the negative terminal 86 of the next battery cell 20. The first connector assembly 22 is adapted so that each of the busbars 30 will engage both the positive terminal 84 of one battery cell 20, and the negative terminal of the adjacent battery cell 20. The first connector assembly 22 is further adapted so that the end busbar 30b will engage a terminal of the final battery cell 20 in the cell stack 18.

Referring back to FIG. 2, the assembled battery assembly 12 is shown, including the cell stack 18, the first connector assembly 22, and the second connector assembly 22' attached thereto. As previously described in reference to FIG. 8, each busbar 30 is connected to one positive terminal 84 and one negative terminal 86. The end busbar 30b is connected to one positive terminal 84. The illustrated busbars 30, 30a and 30b are connected to the respective terminals 84 and 86 by welding, but may be attached by any desired fastener or method. The illustrated connector assembly 22 and the second connector assembly 22' are attached to the cell stack 18 with their respective connector axes 50c and 50c' substantially parallel to each other. However, the connector assemblies 22 and 22' may be connected to the cell stack 18 with any desired relative orientation.

The first connector assembly 22 is shown with the connection tab 82 extending from a first end 88 of the battery assembly 12. The illustrated second connector assembly 22' is substantially the same as the first connector assembly 22, and will not be described in detail. As shown, the illustrated second connector assembly 22' is rotated 180-degrees relative to cell stack 18 compared to the orientation of the first connector assembly 22 and includes a second connection tab 82' extending from a second end 90, opposite the first end 88, of the battery assembly 12. It should be appreciated that the first connector assembly 22 and the second connector assembly 22' provide a continuous electric path from the connection tab 82, through all the battery cells 20, to the second connection tab 82'.

FIG. 2 illustrates both the first connector assembly 22 and the second connector assembly 22' with respective covers 92 and 92' installed. The illustrated cover 92 is a single molded component that covers all the modules 28 and 28b. The cover 72 was previously described for the first busbar module 28 in reference to FIG. 3 and FIG. 4. It should be appreciated that the cover 92 may be comprised of a plurality of individual covers attached to each module 28 and 28*b*, if desired. Further, although the prior description describes the first connector assembly 22 and the second connector assembly 22' as being separate components this is not necessary, and the connector assemblies 22 and 22' may be a single component. Similarly, the covers 92 and 92' may be a single component, if desired.

The battery assembly 12 includes a wire harness 94 and a wire harness 94' that are connected to a wire harness connector 96. The wire harness 94 includes the wires that are connected to the sensors 38 on the busbar 30 (previously described in reference to FIG. 3). It should be appreciated that the busbars 30*a* and 30*b* may also include attached sensors (not shown). The wire harness connector 96 is connected to a battery management system module (not shown) that is adapted to monitor and control the battery assembly 12. The wire harness 94 is located within the connector channel 70*c* of the first connector assembly 22, while the wire harness 94' is located within a second connector channel 70*c'* of the second connector assembly 22'.

It should be appreciated that with the busbar modules 28 and 28*b* adapted for the dimensions of the battery cell 22, the connector assemblies 22 and 24 may be easily constructed in any desired length by connecting the appropriate number of modules 28 and 28*b*. Thus, if a different application requires a different number of battery cells 20 in the cell stack 18, the appropriately-sized connector assemblies 22 and 24 may be created using existing components.

The illustrated embodiment of the battery assembly 12, the first connector assembly 22 and the second connector assembly 22' are substantially the same. It should be appreciated that this is not necessary, and the first connector assembly 22 and the second connector assembly 22' may be different if desired. Further, in the illustrated embodiment, the first connector assembly 22 and the second connector assembly 22' each include one end module 28*b* but this is not necessary. For example, if the cell stack 18 included an even number of battery cells 20, the first connector assembly 22 could include two end modules 28*b* while the second connector assembly 22' includes only first busbar modules 28 and no end modules 28*b*.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A battery cell stack connector assembly comprising:
   a plurality of busbar modules each including a module frame with a first side with a first connector and a second side with a second connector and each module frame defining a module axis that extends from the first side to the second side, and a busbar attached to the module frame;
   the plurality of busbar modules connected to form a connector frame defining a connector axis that extends from a first assembly side to a second assembly side wherein the module axes of the plurality of busbar modules are aligned with the connector axis,
   wherein the first connectors and second connectors are adapted so that each of the plurality of module frames is mated with and attached to respective adjacent module frames.

2. The battery cell stack connector assembly of claim 1, wherein each busbar module defines a channel extending from the first side to the second side.

3. The battery cell stack connector assembly of claim 2, wherein the channels of the plurality of busbar modules define a connector channel that extends from the first assembly side to the second assembly side, the channel being substantially parallel to the connector axis.

4. The battery cell stack connector assembly of claim 3, further including a plurality of wires located in the connector channel, the wires connected to sensors on at least one of the plurality of busbars.

5. The battery cell stack connector assembly of claim 2, wherein each of the plurality of busbars includes a connection portion and a sensor portion that extends from the connection portion to the channel.

6. The battery cell stack connector assembly of claim 1, wherein each of the plurality of busbars is recessed from a first frame face of the connector frame and a second frame face of the connector frame.

7. The battery cell stack connector assembly of claim 1, wherein each busbar has a busbar length along the connector axis and each busbar is separated from an adjacent busbar by a busbar space along the connector axis, and wherein each of the busbars has the same busbar length, and each busbar space has the same length.

8. The battery cell stack connector assembly of claim 7, further including an end busbar located at the first assembly side of the connector frame, the end busbar having an attachment portion with an end busbar length that is shorter than the busbar length.

9. The battery cell stack connector assembly of claim 8, the end busbar including a connection tab that extends from the attachment portion.

10. The battery cell stack connector assembly of claim 9, wherein the connection tab extends from the attachment portion in the direction of the connector axis.

11. The battery cell stack connector assembly of claim 9, wherein the connection tab extends out of the first assembly side of the connector frame.

12. A busbar module comprising:
    a module frame including a first side with a first connector and a second side with a second connector, the module frame defining both (1) a module axis that extends from the first side to the second side and (2) a channel that extends from the first side of the module frame to the second side of the module frame; and
    a busbar attached to the module frame and located between the first side and the second side.

13. The busbar module of claim 12, wherein the first connector is adapted to mate with and engage a second connector on a second busbar module, and the second connector is adapted to mate with and engage a first connector on the second busbar module.

14. The busbar module of claim 12, wherein the module frame defines a busbar space that extends from a first face of the module frame to a second face of the module frame, and the busbar is located within the busbar space.

15. The busbar module of claim 12, wherein the busbar includes an attachment portion and a sensor portion that extends from the attachment portion to the channel.

16. The busbar module of claim 15, wherein the sensor portion extends from the attachment portion in a sensor direction that is perpendicular to the module axis.

17. A battery assembly comprising:
    a plurality of battery cells, each of the plurality of battery cells including a positive terminal and a negative terminal; and
    a plurality of busbar modules attached to form a connector assembly, each busbar module including a module frame with a first side with a first connector and a second side with a second connector and each module frame defining a module axis that extends from the first side to the second side, and a busbar attached to the module frame, wherein the first connectors and second connectors are adapted so that each of the plurality of module frames is mated with and attached to respective adjacent module frames;

wherein each of the plurality of busbars is attached to the positive terminal of one of the plurality of battery cells and the negative terminal of another of the battery cells.

18. The battery assembly of claim 17, further including a second plurality of busbar modules attached to form a second connector assembly; wherein each of the second plurality of busbars is attached to the negative terminal of one of the plurality of battery cells and the positive terminal of another of the battery cells, such that all the battery cells are electrically connected in series.

19. The busbar module of claim 12, wherein the first connector includes a plurality of extensions and the second connector includes a plurality of channels.

* * * * *